US012697865B2

(12) United States Patent (10) Patent No.: US 12,697,865 B2

Williams (45) Date of Patent: Aug. 4, 2026

(54) RADIAL GAP WHEEL MOTOR SUPPORTED ON HUB BEARINGS IN A PARALLEL ARRANGEMENT

(71) Applicant: Kevin R. Williams, Waller, TX (US)

(72) Inventor: Kevin R. Williams, Waller, TX (US)

( * ) Notice: Subject to any disclaimer, the term of this patent is extended or adjusted under 35 U.S.C. 154(b) by 392 days.

(21) Appl. No.: 18/461,898

(22) Filed: Sep. 6, 2023

(65) Prior Publication Data

US 2025/0074181 A1 Mar. 6, 2025

(51) Int. Cl.
 *B60K 7/00* (2006.01)

(52) U.S. Cl.
 CPC .... *B60K 7/0007* (2013.01); *B60K 2007/0038* (2013.01)

(58) Field of Classification Search
 CPC .......... B60K 7/0007; B60K 2007/0038; B60K 2001/045; B60L 15/20; B62D 7/18; H02K 11/0094; H02K 21/14
 See application file for complete search history.

(56) References Cited

U.S. PATENT DOCUMENTS

| 5,343,128 | A | * | 8/1994 | Beltrame |
| 5,767,595 | A | | 6/1998 | Rosen |

| 6,819,012 | B1 | | 11/2004 | Gabrys |
| 7,552,787 | B1 | * | 6/2009 | Williams |
| 9,862,264 | B2 | | 1/2018 | Lampic |
| 2004/0079567 | A1 | * | 4/2004 | Beltrame |
| 2016/0068054 | A1 | | 3/2016 | Abe |
| 2024/0300316 | A1 | * | 9/2024 | Jeon |

FOREIGN PATENT DOCUMENTS

| DE | 102016218628 A1 * | 3/2018 | .............. B62M 6/90 |
| EP | 2658096 A2 | 4/2022 | |

* cited by examiner

*Primary Examiner* — James A Shriver, II
*Assistant Examiner* — Nicholas R. Kandas
(74) *Attorney, Agent, or Firm* — EGBERT, MCDANIEL & SWARTZ, PLLC

(57) ABSTRACT

A wheel assembly for a vehicle has a rotor housing adapted to be supported on wheel bearings of the vehicle, a stator support structure adapted to be affixed to a non-rotatable portion of the vehicle, and an energy storage module affixed to the stator support structure. The rotor housing has a support structure connected to a rotor. The rotor has permanent magnets therein. The stator support structure has windings therein. These windings are spaced from the permanent magnets of the rotor housing by an air gap. The energy storage module is cooperative with the windings of the stator support structure so as to receive energy from the windings and transmit energy to the windings relative to a motion of the vehicle.

10 Claims, 6 Drawing Sheets

50

70
80
74
60
64
66
62
72
76
78
52
54
56
58
68

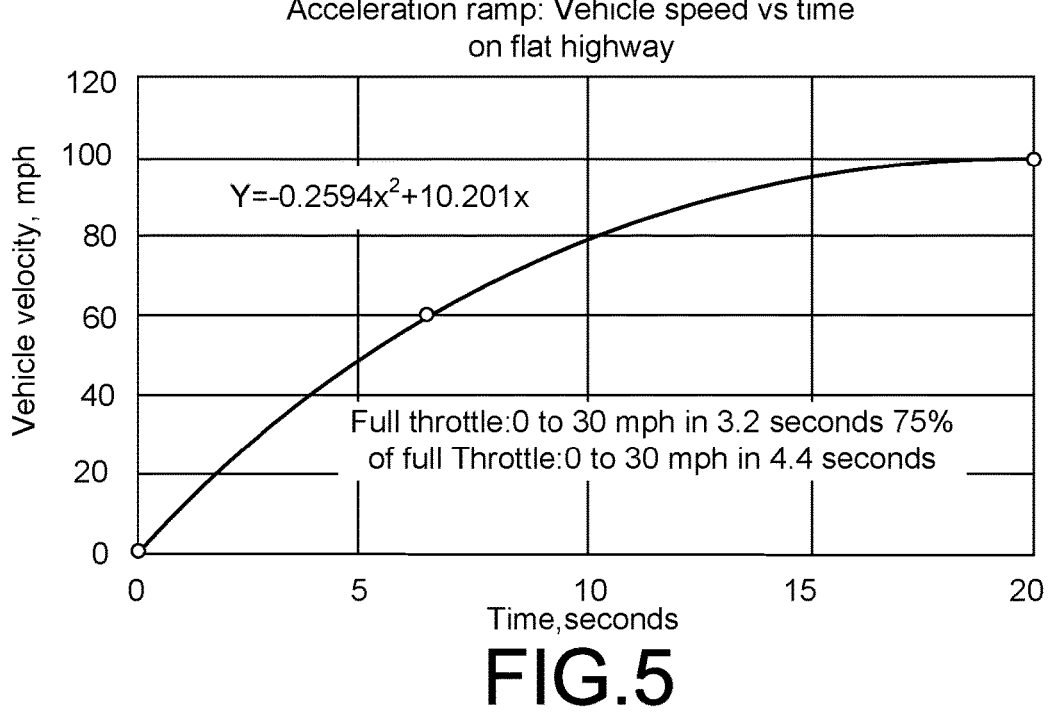

Acceleration ramp: Vehicle speed vs time on flat highway $Y = -0.2594x^2 + 10.201x$ Full throttle: 0 to 30 mph in 3.2 seconds 75% of full Throttle: 0 to 30 mph in 4.4 seconds

FIG.5

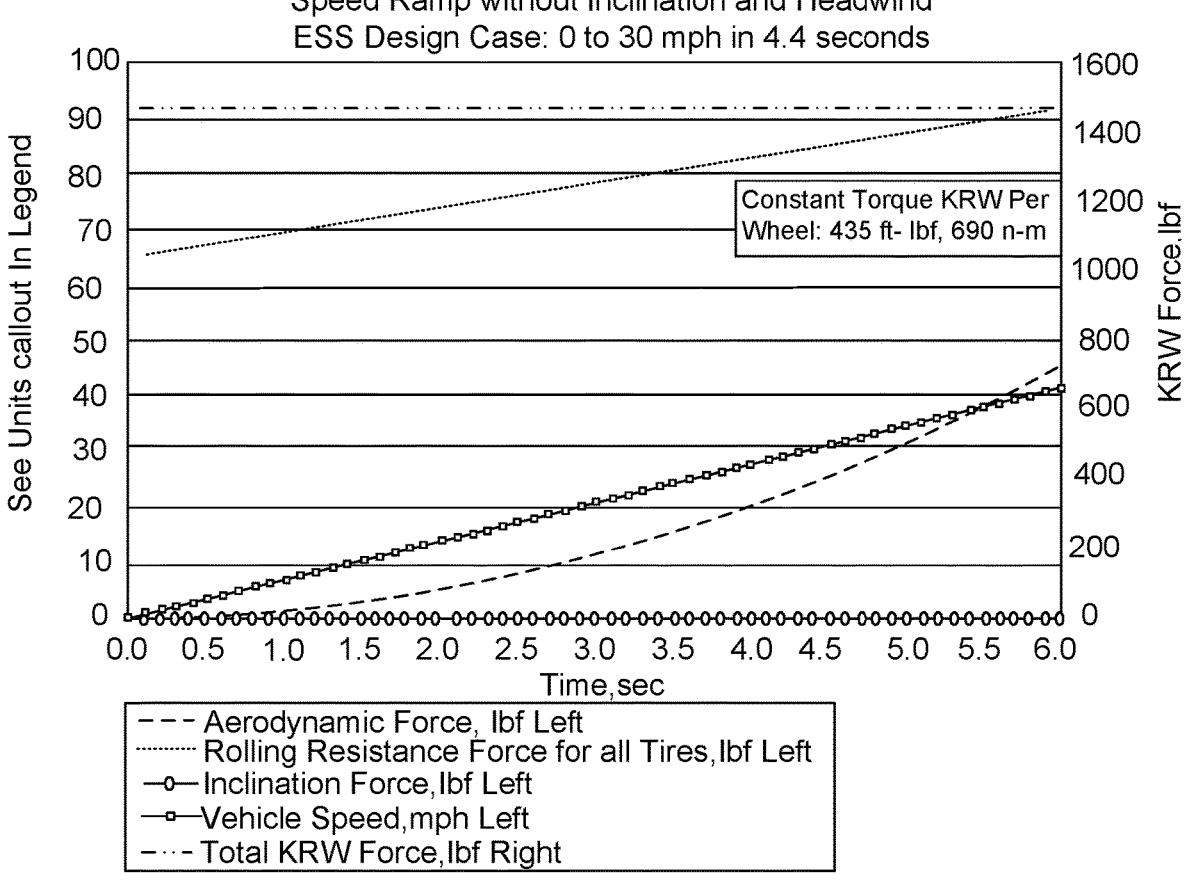

Speed Ramp without Inclination and Headwind
ESS Design Case: 0 to 30 mph in 4.4 seconds Constant Torque KRW Per Wheel: 435 ft- lbf, 690 n-m

- - - Aerodynamic Force, lbf Left
········· Rolling Resistance Force for all Tires, lbf Left
—o— Inclination Force, lbf Left
—▫— Vehicle Speed, mph Left
- ··· - Total KRW Force, lbf Right

FIG. 6

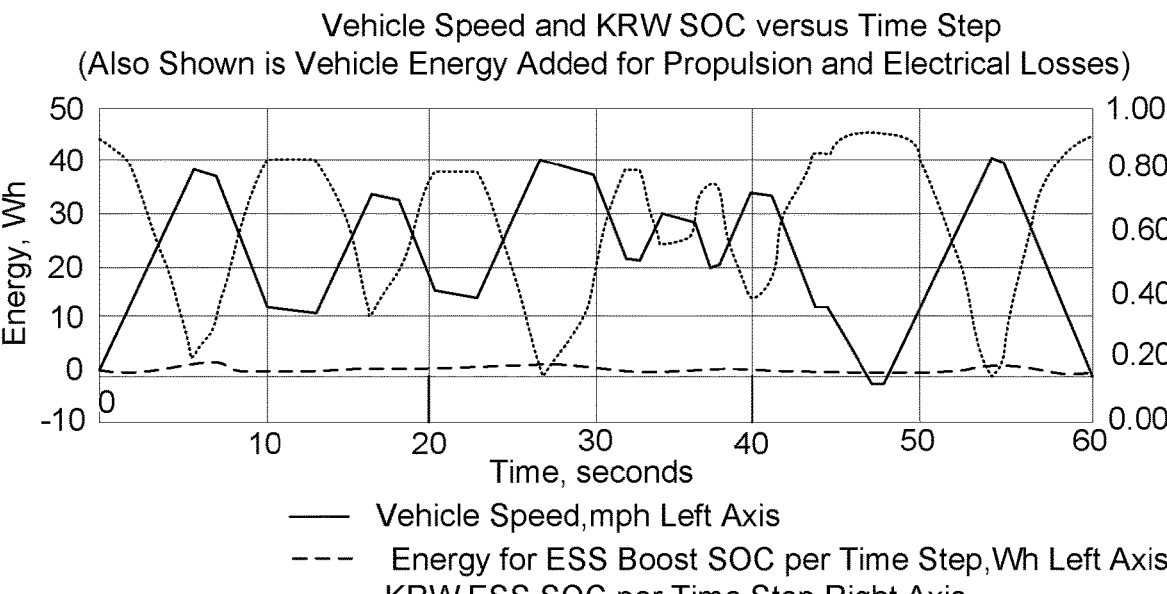

Vehicle Speed and KRW SOC versus Time Step
(Also Shown is Vehicle Energy Added for Propulsion and Electrical Losses)

—— Vehicle Speed,mph Left Axis

– – – Energy for ESS Boost SOC per Time Step,Wh Left Axis

········· KRW ESS SOC per Time Step Right Axis

FIG.9

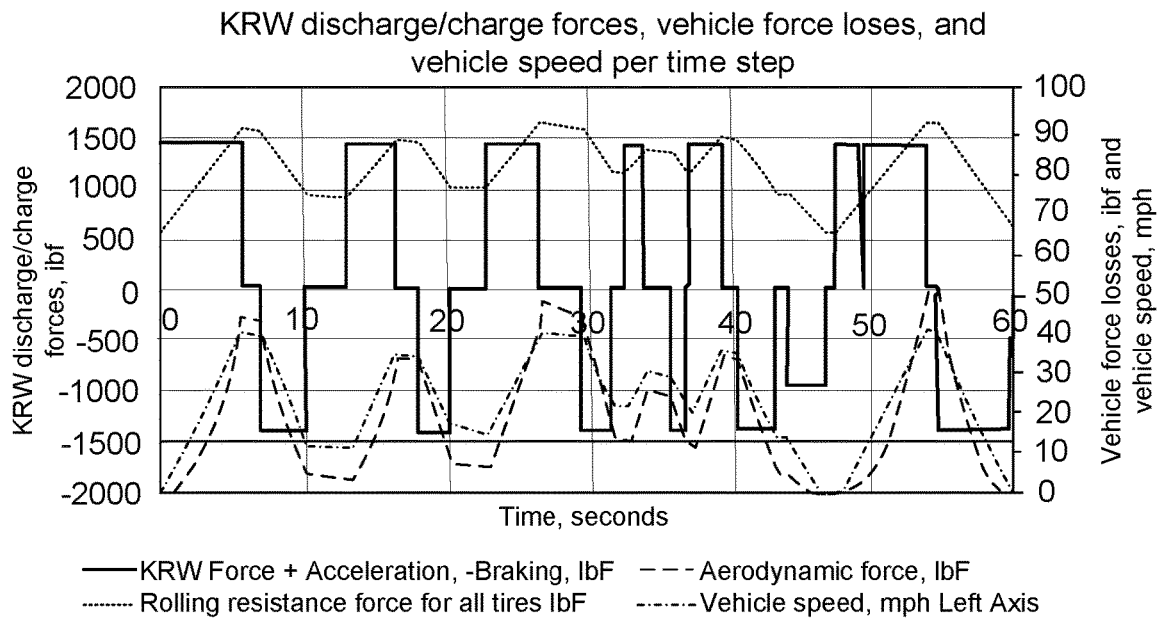

KRW discharge/charge forces, vehicle force loses, and
vehicle speed per time step ——KRW Force + Acceleration, -Braking, lbF    – – – Aerodynamic force, lbF
········ Rolling resistance force for all tires lbF    –·–·–Vehicle speed, mph Left Axis

FIG.10

RADIAL GAP WHEEL MOTOR SUPPORTED ON HUB BEARINGS IN A PARALLEL ARRANGEMENT

CROSS-REFERENCE TO RELATED APPLICATIONS

Not applicable.

BACKGROUND OF THE INVENTION

1. Field of the Invention

The present invention relates to wheel motors. More particularly, the present invention relates to radial gap wheel motors that are supported on hub bearings. More particularly, the present invention relates to wheel motors that can be retrofitted to existing wheel stations of vehicles and in which an energy storage module is positioned on the wheel.

2. Description of Related Art Including Information Disclosed Under 37 CFR 1.97 and 37 CFR 1.98

As the price of fossil fuel rises and more and more people are utilizing personal vehicles as a means for transportation, the demand for fuel continues to increase. The population of the world is increasing, but just as importantly, the general population of many countries, which historically did not have personal engine-driven vehicles, is on the rise. There is also more and more demand for hybrid-electric vehicles, fuel cells, and electric means for transportation. These are designed for the most efficient means of converting energy to propulsion with the least amount of energy consumed.

In the conservation of energy, losses during the braking action of a motorized vehicle can be stored and reused during the acceleration of the vehicle. The efficiency of energy consumption for propulsion is increased and less energy is used because of capturing and reusing the energy that is normally burned as excess heat in the vehicle's braking system. There are many proven technologies which utilize this method of energy recovery. These technologies date back twenty or thirty years and are utilized on many hybrid electric vehicles.

A major problem with existing hybrid electric vehicles is the fact that the entire vehicle must be purchased in order to obtain the benefits of the electric propulsion. There have been, in the past, systems wherein the internal combustion engine can be retrofitted or converted into a hybrid vehicle. The ease of conversion is very important so as to facilitate the conservation and use of energy. With the tightening of federal emissions regulations combined with public concern over transportation-related pollution, the market for electric vehicles is growing. However, even with increased production, electric vehicles remain more expensive than comparably-performing fossil-fueled vehicles. As such, there has been a need for a low-cost retrofit for fossil-fueled cars and trucks that provides performance improvement during start-and-go-stop traffic (<40 miles per hour) so as to reduce fuel use and emissions. There is also a need for secondary action to assist with power boost at highway speed. It is important to be able to retrofit such vehicles including off-road vehicles, along with both personal and commercial vehicles. Also, there is a need to be able to retrofit conventional bicycles so as to provide electric bicycles at lower cost.

In the past, a variety of in-wheel motors have been provided in the prior art. For example, U.S. Pat. No. 7,552,787, issued on Jun. 30, 2009 to K. R. Williams, describes an energy-recoverable wheel motor for attachment to an axle. This energy-recoverable wheel motor has a motor mount plate suitable for attachment to the axle, a rim defining an outward periphery of the wheel, a flywheel mounted interior of the rim and freely rotatable relative to the motor mount plate, a first rotor motor affixed to an interior surface of the flywheel so as to rotate with a rotation of the flywheel, and a second stator motor fixedly positioned relative to the first rotor motor. A second stator motor is affixed to the motor mount plate. A stator motor is fixedly positioned relative to the second stator motor. The first stator motor is affixed to one side of the vehicle mounting plate. The second rotor motor is affixed to an opposite side of the vehicle mounting plate.

European Patent No. 2658096, published on Apr. 27, 2022 to M. Broughtwood, describes an electric motor or generator for mounting in a wheel of a road vehicle. This electric motor or generator has a stator having a plurality of coils, a rotor having a radial wall and a circumferential wall in which a plurality of magnets are mounted on the inside of the circumferential wall surrounding the coils of the stator, a bearing block having a first part affixed to the stator and a second part affixed to the rotor. The radial wall of the stator has a central portion for mounting to a vehicle on one side and for connection to the first part of the bearing block. The radial wall of the rotor has a central portion for mounting a wheel on the outside of the rotor and to the second part of the bearing block on the inside of the rotor. The wheel is mountable to the motor at the central portion of the radial wall of the rotor for connection to a vehicle by the bearing block. The outside of the circumferential wall of the rotor has no load-bearing portions.

U.S. Pat. No. 9,862,264, issued on Jan. 9, 2018 to Lampic et al., shows an in-wheel electric motor. This in-wheel electric motor comprises at least one stator, a rotor plate, a rotor tube, a bearing system, and a brake system arrange such that the rotor plate is attached to the rotor tube and to the bearing system. The opening of the rotor tube and stator is on at least one axial side larger than the largest braking system or bearing system part. The brake system and bearing system parts, along with the attachment points, are accessible when the rotor plate and outer parts of the brake system, bearing system and the rim are removed. The rim is a separate part of the rotor plate and rotor tube. The rotor plate attachment to the bearing system is in parallel to the rim attachment. On one of the flanges, there is an edge with its height smaller than the smallest radial cranny between the rotor tube and the stator.

U.S. Patent Application Publication No. 2016/0068054, published a Mar. 10, 2016 to Abe et al., teaches an in-wheel motor unit for a vehicle. This in-wheel motor unit has a drive output shaft of a drive unit body and a wheel hub shaft supported by a hub bearing with respect to a case member of the drive unit body. These are connected via a displacement absorption mechanism. The displacement absorption mechanism comprises an output shaft side drive transmission fitting portion allowing a first inner tooth portion of the drive output shaft to mesh with a first outer tooth portion of a gear coupling shaft, and a hub shaft side drive transmission fitting portion allowing a second inner tooth portion of the hub wheel shaft to mesh with a second outer tooth portion of the gear coupling shaft. The second outer tooth portion is arranged axially in the vehicle exterior side with respect to a wheel mounting surface on which a tire wheel is mounted to the wheel hub.

U.S. Pat. No. 6,819,012, issued on Nov. 16, 2004 to C. W. Gabrys, describes a flywheel energy storage system which has an energy storage flywheel supported in a low-pressure containment vessel for rotation on a bearing system. A brushless motor/generator is coupled to the flywheel for accelerating and decelerating the flywheel in order to store and retrieve energy. The flywheel is rotated in normal operation at a speed such that the generator voltage is higher than the output voltage. The power supply of the flywheel efficiently maintains power to an electrical load during an interruption of primary power by supplying power generated from the flywheel's generator.

U.S. Pat. No. 5,767,595, issued on Jun. 16, 1998 to H. A. Rosen, provides a flywheel support system that isolates the flywheel and its motor-generator from the driving environment of an electrically-powered motor vehicle. During normal operation, a mechanical gimbal system keeps the vacuum housing centered in the outer housing, reacts the spin moments generated by the motor-generator, and provides a passage for the electrical leads into the vacuum housing. A suitable liquid is placed between the outer and vacuum housings of the flywheel assembly to provide buoyancy and damping to the vacuum housing, cooling the motor-generator, and serving as one of the barriers to rotor energy and angular momentum transfer in the event of an accident or failure.

The Protean E-class in-wheel motor (see proteanelectric-.com) shows a motor that can significantly improve fuel economy in hybrid configurations when compared with existing vehicles. The drive system has superior regenerative braking capabilities that allows up to 85% of the available kinetic energy to be recovered during braking.

The YASA in-wheel motor includes both radial gap and axial gap designs. In particular, this is an axial flux permanent magnet machine. The electric motors and controllers provide great efficiency and highest power and torque density for the smallest size and weight. Direct oil cooling helps the motors achieve higher continuous power.

The Nissan in-wheel motor (see Nissan-Global.com) places the motor next to the wheel and is not integrated into the wheel. By using separate front and rear electric motors, the powertrain generates 227 kilowatts of maximum output and 680 Nm of maximum torque. This output is complemented by the ultra-high-precision motor control that offers highly responsive, yet smooth, acceleration.

The Elaphe in-wheel motor (see in-wheel.com) is a compact in-wheel motor with an integrated standard disc brake, a standard outer caliper, and a standard hub bearing. It is designed to fit the original vehicle knuckle because of a packaging concept.

The Printed Motor Works in-wheel motor (see https:\\www.printedmotorworks.com/industries/automotive/) allows the car to use regenerative braking and captures over 50% of the kinetic energy by using a bank of supercapacitors in the front of the car to store the electrical power generated.

The Eco-Move in-wheel motor (see https://www.eco-move-emobility.net/about-us) has an in-wheel electric powertrain that is powerful and compact. The entire power train is located within the wheel because of a compact traction motor. Traction and braking using a disc calipers are included.

These prior art in-wheel motors fail to integrate energy storage directly into the removable wheel assembly. As such, an easy and simple retrofit of the wheel onto the vehicle cannot be achieved. In the past, these power systems require energy storage at a location away from the wheel. As such, complex wiring schemes and control systems are required in order to effectively integrate the energy storage with the wheel motor.

It is an object to the present invention to provide a wheel motor in which energy storage is integrated into the wheel housing.

It is another object of the present invention to provide a wheel motor that can be retrofitted to existing wheel stations of internal combustion engines and other powered vehicles.

It is another object of the present invention to provide a wheel motor that can be easily installed using conventional tools.

It is another object of the present invention to provide a wheel motor that provides acceleration boosts and deceleration energy recovery.

It is another object of the present invention to provide a wheel motor that offers fuel use reduction.

It is another object of the present invention to provide a wheel motor that effectively reduces emissions.

It is another object of the present invention to provide a wheel motor that has a relatively low cost.

It is another object of the present invention to provide a wheel motor that is adaptable to a wide variety of vehicles.

It is still another object of the present invention to provide a wheel motor that can be stackable in series.

It is another object of the present invention to provide a wheel motor that is adaptable to bicycles.

It is a further object of the present invention to provide a wheel motor that requires no alterations in the engine, transmission, computer control module or brake system of the vehicle.

It is still a further object of the present invention that effectively provides a small package for energy storage as a result of the adaptive switching.

These and other objects and advantages of the present invention will become apparent from a reading of the attached specification and appended claims.

BRIEF SUMMARY OF THE INVENTION

The present invention is a wheel assembly for a vehicle that comprises a rotor housing adapted to be supported on wheel bearings of the vehicle, a stator support structure adapted to be affixed to a non-rotatable portion of the vehicle, and an energy storage module affixed only to one of the rotor housing and the stator support structure. The rotor housing has a support structure connected to a wheel rim support structure. The support structure has a wheel rim. The rotor has permanent magnets affixed thereto. The stator support structure has windings therein. The windings are spaced from the permanent magnets of the rotor housing by an air gap. The energy storage module is cooperative with the windings of the stator support structure so as to receive energy from the windings and to transmit energy to the windings relative to a motion of the vehicle. A tire is affixed to the wheel rim of the rotor housing.

In the present invention, the support structure of the rotor housing is bolted to the wheel hub. The stator support structure is adapted to be affixed to a steering knuckle of the vehicle. Alternatively, and also, the stator support structure is adapted to be affixed onto a back of the wheel hub of the vehicle. A mechanical or an electromechanical connect/disconnect between the stator support structure and the stationary wheel structure permits ease of wheel attachment and/or removal.

The energy storage module has a housing affixed to the rotor housing. The energy storage module has an energy storage element selected from the group consisting of capacitors, ultra-capacitors, chemical batteries, solid-state batteries and combinations thereof. The energy storage module has an accelerometer therein. The accelerometer is adapted to detect an acceleration or a deceleration of the vehicle. The acceleration is used by the wheel motor for operational control. The rotor is positioned radially inwardly of the windings. The rotor of the rotor housing is supported on the wheel's bearings radially inwardly of the stator housing. The air gap is concentric to the axis of rotation of the rotor housing.

The present invention is also an assembly that comprises a vehicle having a plurality of wheel stations and a wheel assembly affixed to at least one of the plurality of wheel stations. Each wheel station of the plurality of wheel stations has a wheel hub, wheel bearings and wheel bolts. The wheel hub is connected to a hub shaft. The wheel assembly is affixed to the wheel hub and bolted to the wheel bolts. The wheel assembly comprises a rotor housing supported on the wheel bearings of the vehicle, a stator support structure affixed to a non-rotatable portion of the vehicle, and an energy storage module affixed the stator housing and the stator support structure. The rotor housing has a support structure connected to a rotor. The support structure defines a wheel rim. The rotor has permanent magnets therein. The stator support structure has windings therein. The windings of the stator support structure are spaced from the permanent magnets of the rotor by an air gap. This air gap is concentric to the axis of rotation of the rotor housing. The energy storage module is cooperative with the permanent magnets and the windings so as to receive and transmit energy from and to the permanent magnets and the windings.

A tire is affixed to the wheel rim of the rotor housing. The support structure of the rotor housing is bolted to the wheel hub.

In the present invention, the plurality of wheel stations has at least one steering wheel station. The steering wheel station has a steering knuckle. In an embodiment of the present invention, the stator support structure is affixed to the steering knuckle. Alternatively or also, the stator support structure can be affixed to a back of the wheel hub of the wheel station of the vehicle.

The energy storage module has a housing affixed to the stator support structure. This energy storage module has an energy storage element therein. This energy storage element is selected from the group consisting of capacitors, ultra-capacitors, chemical batteries, solid-state batteries and combinations thereof.

The present invention is a novel design that permits fuel savings and emissions reduction similar to those of electric vehicles as a retrofit to fossil-fueled vehicles. The in-wheel motor design of the present invention integrates the energy storage system directly into the assembly. This offers the benefit of regenerative energy braking without the added cost of larger, more expensive batteries typically found on electric vehicles.

Experiments with the present invention have indicated that retrofitting a fossil-fueled vehicle with the present invention results in a 57% reduction in fuel use and emissions output for stop-and-go traffic, typically up to 40 mph. The technology also provides acceleration boosts and energy recovery during deceleration at higher velocity driving cycles, such as at 50 miles an hour to 65 miles an hour or 60 miles an hour to 70 miles per hour.

The intended market for the present invention is for a low-cost retrofit for fossil-fueled vehicles and trucks and focused on performance improvement during start-and-gostop traffic at less than 40 mph. This reduces fuel use and emissions. Secondary action is provided to assist with power boost at highway speed. The present invention is also applicable to off-road vehicles, both personal and commercial. The present invention is also applicable as a retrofit to conventional bicycles resulting in electrical bicycles at lower costs.

Since the wheel motor of the present invention is a retrofit to the existing vehicle, the braking system, the transmission system, and the internal combustion engine system is not affected by the installation of the wheel motor of the present invention. The braking system will remain intact and no modification is necessary. Since the energy storage model is integrated into the structure of the wheel motor, there is no need for complicated wiring to a battery bank within the vehicle.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

BRIEF DESCRIPTION OF THE SEVERAL VIEWS OF THE DRAWINGS

FIG. 5 is a graph of acceleration ramp of vehicle speed versus time.

FIG. 6 is a graph of speed ramp without inclination and headwind.

FIG. 9 is a graph showing vehicle speed versus the energy of the wheel motor over time.

FIG. 10 is a graph of vehicle speed versus discharge/charge forces and vehicle force losses per time step.

DETAILED DESCRIPTION OF THE INVENTION

Figure 1:
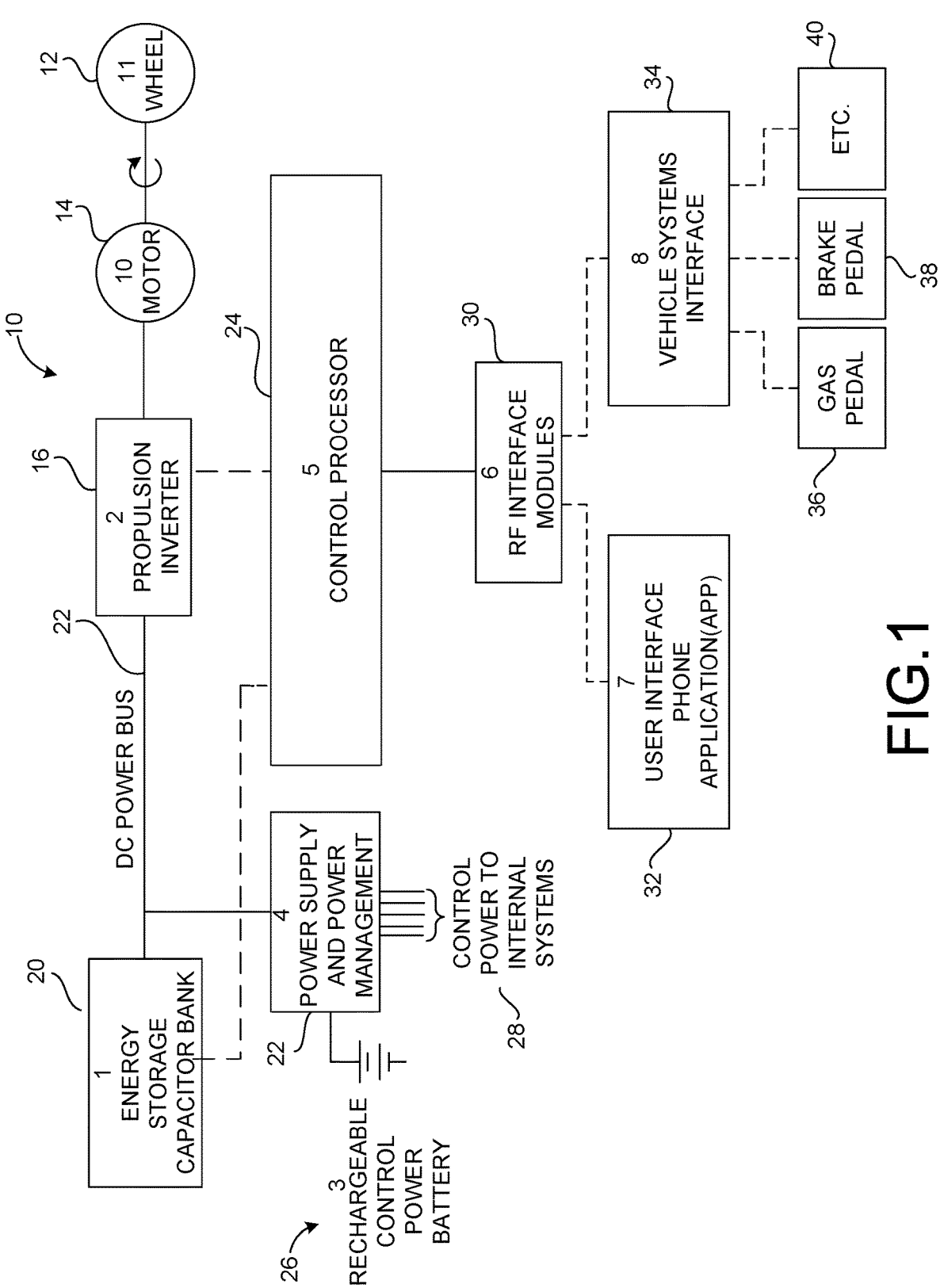
FIG. 1 is a block diagram showing the system architecture associated with the radial gap wheel motor system supported on hub bearings in a parallel arrangement of the present invention.

Referring to FIG. 1, there is shown the electrical system topology 10 associated with the wheel motor of the present invention. In particular, this electrical system topology 10 shows a wheel 12 that is driven by a motor 14. As will be described hereinafter, motor 14 will be part of wheel 12 and will cause the permanent magnets and windings to cooperate with each other for the driving of the wheel 12 or for the regenerative braking of the wheel 12. A propulsion inverter 16 switches the DC power from the energy storage capacitor bank 20 into voltages required by the motor 14. This inverter 16 can take any form such as a common 6H, isolated windings with 2H bridges, matrix converters, etc. A DC power bus 22 extends between the energy storage capacitor bank 20 and the propulsion inverter 16. The motor 14 can be any type of electric motor, such as an AC motor, DC motor, an induction motor, and a permanent magnet motor (including neither axial gap or radial gap arrangements).

The energy storage capacitor bank 20 stores energy during braking and supplies energy during acceleration. The energy storage capacitor bank 20 can be any type of capacitor, ultra-capacitor, chemical batteries, solid-state batteries, or combinations of capacitors and chemical batteries.

An internal power supply 23 utilizes energy stored or being generated or supplies electrical power to the control circuitry associated with the control processor 24. An internal battery 26 can be charged from the internal power supply 23. This battery 26 supplies power when the vehicle is not able to recharge the energy storage capacitor bank 20, such as following a cold start. The internal power supply 23 can also, in an alternative embodiment, deliver power to internal systems 28.

The control processor 24 contains control logic. The electronics contained in the control processor 24 generate gating signals for the inverter 16 and internal switching based on inputs from internal sensors, remote controls user configuration, etc. The control processor 24 can also be connected, optionally, with a radio frequency interface module 30. Radio frequency interface module can be configured so as to allow monitoring signals from the wheel 12, the motor 14 and the energy storage capacitor bank 20 to be monitored at user interface phone application 32. Alternatively or furthermore, the radio frequency interface module 30 can transmit signals to a vehicle systems interface 34 for cooperation with gas pedal 36, brake pedal 38, and other systems within the vehicle 40.

As shown in FIG. 1, there are various electrical lines connecting the various components. Importantly, the propulsion inverter 16, the energy storage capacitor bank 20 and the control processor 24 can be mounted onto the wheel 12. As such, all of the operational components for the system of the present invention are confined to the wheel structure. As a result, it is not necessary to extend lines throughout the vehicle. All that is necessary is to replace the existing wheel and tire with the present wheel motor 10.

Figure 2:
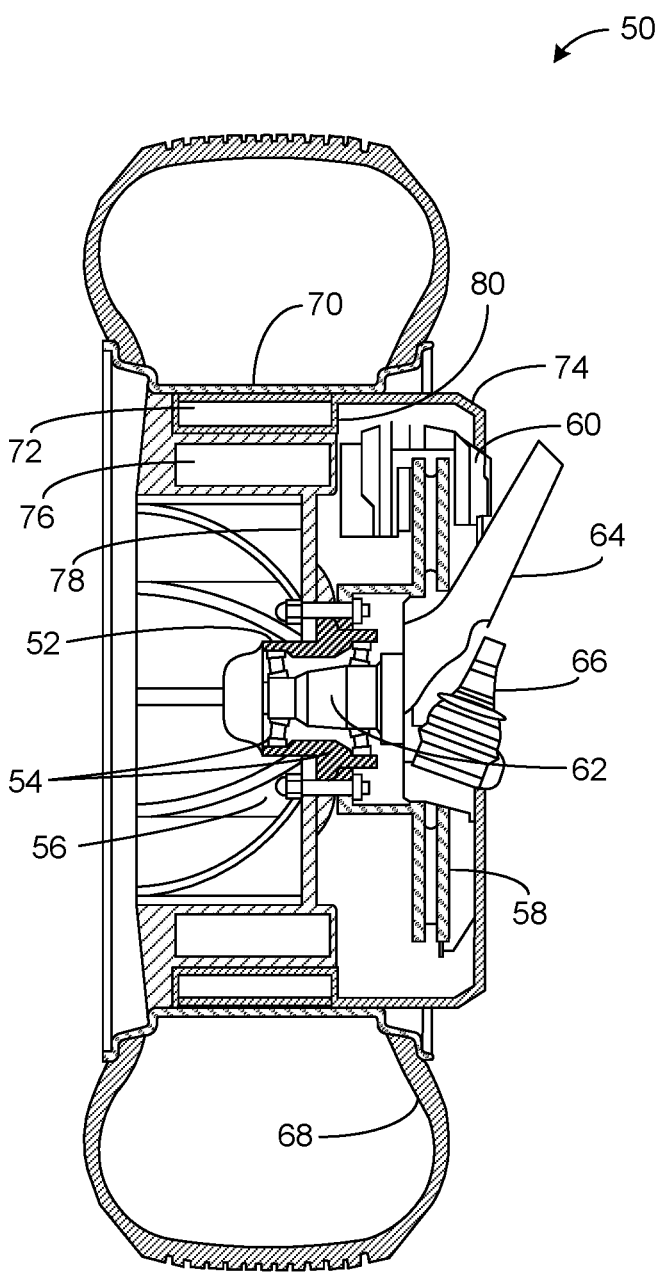
FIG. 2 is a cross-sectional view showing the wheel motor in accordance with the teachings of the preferred embodiment of the present invention.

FIG. 2 is a cross-sectional view of the radial gap wheel motor 50 of the present invention. In particular, the radial gap wheel motor 50 is supported on hub bearings in a parallel arrangement. It should be noted at this point that the parallel arrangement differentiates how the wheel motor's torque output is resolved. This parallel approach resolves torque through a structural link that is attached to the non-rotating wheel assembly. The parallel arrangement utilizes the approach in which it is supported entirely by the vehicle's hub bearings. The radial gap wheel motor 50 is a segmented design involving a two-step installation. The components are divided between those that rotate and those that are stationary. The non-rotating stationary components are contained within a housing that is attached to the non-rotating wheel knuckle. The rotor of the wheel motor 50 is solely supported on the hub bearings.

FIG. 2 shows a cross-section of the wheel motor that is usable on both steered and non-steered wheels and both driven and non-driven wheel stations. FIG. 2 shows a conventional wheel hub 52, wheel bearings 54, wheel bolts and lugs 56, brake rotor 58, and brake caliper 60. The wheel shaft 62 is attached to the vehicle's driven shaft (not shown). The components identified hereinabove are typical manufacturers' products that are included in the original vehicle. The steering-related components include the steering knuckle 64 and the steering support joint 66. Once again, the steering-related components are also unaltered as originally supplied with the vehicle.

It should be noted that at a fixed wheel station, the steering components 64 and 66 are replaced by linkages germane to a non-steerable arrangement. For a non-driven wheel, the hub shaft 62 is not connected to a driven shaft. In all the embodiments, the tire 68 is mounted onto the wheel rim 70.

The stator housing 72 is supported by the stator support structure 74 so as to convey the generated torque to the frame of the vehicle. The stator support structure 74 can be bolted to the steering knuckle 64 or could be attached directly to the non-rotating back portion of the wheel hub 52. The stator support structure 74 is a segmented hub-type structure that facilitates installation. In particular, the stator housing 13 includes windings thereon. As will be described hereinafter, these windings are ultimately connected to the propulsion inverter 16 and to the energy storage capacitor bank 20 (as shown in FIG. 1). The stator housing 72 can also include the capacitor energy storage system, micro-inverters, windings, laminations, DC-DC converters and computer controllers (not shown). The details of the construction of this energy storage module and controller electronics are shown in greater detail in association with FIGS. 3 and 4. The stator housing 72 is constrained from rotating by way of the stator support structure 74. The stator housing 72 can include energy storage in the form of capacitors or chemical batteries, or a combination thereof. Chemical batteries can also include solid-state batteries.

The rotor housing 76 is structurally integrated into a purpose-built wheel design. The rotor and wheel rim support structure 78 is bolted to the wheel hub 52 by conventional wheel bolts and lugs 56. Wheel rim 70 is located at the outer periphery of the rotor and wheel rim support structure 78. The high-profile tire 68 is received within this wheel rim 70. The rotor housing 76 includes permanent magnets and laminations. Cooling passages can be embedded within the design of the present invention for the rejection of heat generated during operation. The rotor housing 76, the rotor and wheel rim support structure 78, the outer wheel rim 70, the wheel tire 68, and the wheel hub 52 are entirely supported on the wheel bearings 54.

During installation, the stator support structure 74 (which also includes the stator housing 72 and its internal components) is positioned in place by bolting the stator support structure 72 on to the back of wheel hub 52 or steering knuckle 64. The internal components of the stator housing and the energy storage module include micro-inverters, windings, laminations, DC-DC converters, and computer controllers. The rotor housing 76 is then positioned into place by bolting the rotor and wheel rim support 78 onto the wheel hub 52 using the wheel bolts and lugs 56. Removal is the reverse of this procedure.

In FIG. 2, it can be seen that there is an air gap 80 formed between the windings of the stator housing 72 and the permanent magnets of the rotor housing 76. This air gap 80 is concentric to the axis of rotation of the wheel hub 52. The rotor housing 76 is illustrated as positioned radially inwardly of the stator housing 72.

Figure 3:
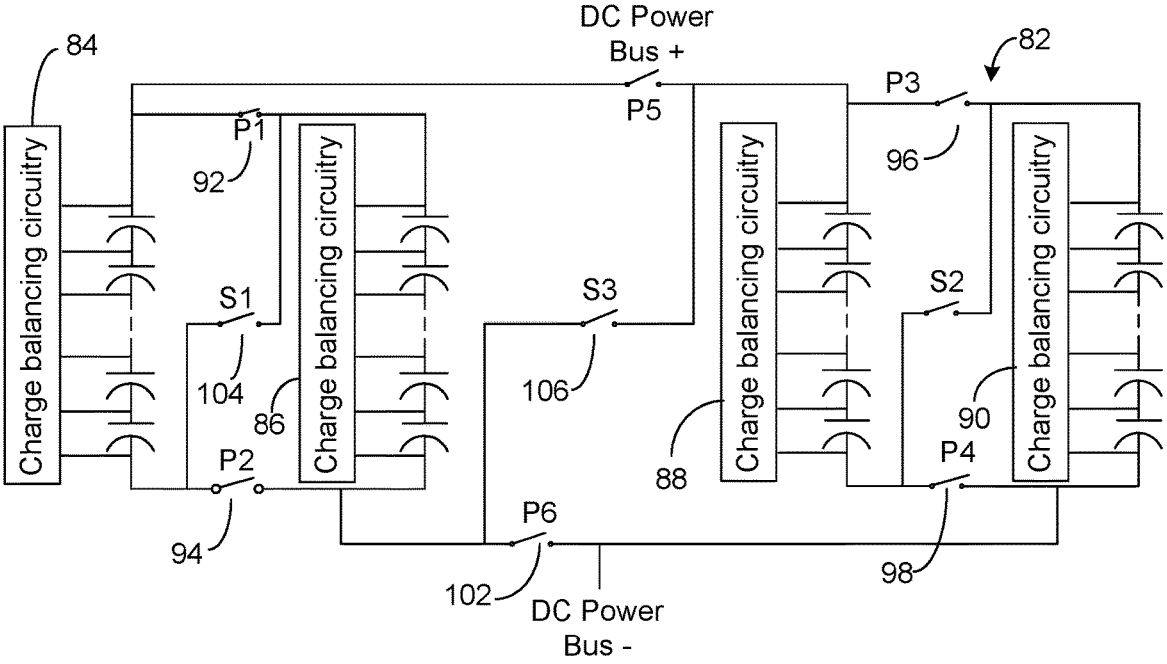
FIG. 3 is an electrical schematic showing the switching devices associated with the capacitors and adaptive voltage control as used in the energy storage module of the present invention.
Figure 4:
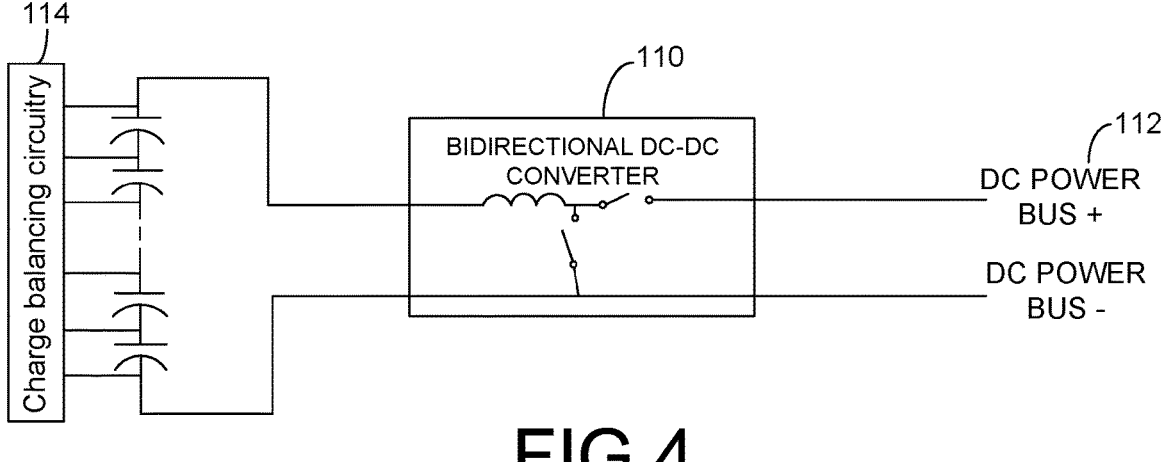
FIG. 4 is an electrical schematic and block diagram showing an alternative embodiment of a DC-DC converter for the control of voltages in the energy storage module of the present invention.

In the present invention, it is important that the energy storage module is affixed to the stator housing 72. The energy storage module is cooperative with the windings of the stator support structure 72 so as to receive energy from the windings and to transmit energy to the windings relative to a motion of the vehicle. Since this energy storage module must occupy an a relatively small space on the wheel motor 50, a unique configuration of capacitors and/or batteries is required so as to properly implement the present invention. FIGS. 3 and 4 shows such an arrangement.

The present invention implements a capacitor and adaptive voltage control system 82 (as illustrated in FIG. 3). It is important to note that capacitors have high-power densities and long-cycle lives far exceeding those of chemical batteries. One challenge for applications, such as that of the present invention, arises from the low voltage rating of such capacitors. It is found that the capacitor-based solutions that achieve the needed stored energy fall short of the needed voltage rating. This places a greater demand on the inverter designed to limit voltage resulting in greater inverter volume and weight as cells are placed in series in order to meet the voltage requirements.

Two principal factors are responsible for driving the voltage higher. The energy stored is proportional to the square of voltage and the DC supply to the inverter must be greater than the operating voltage of the inverter. In the former case, doubling the voltage allows the storage of four times as much power for a given capacitance. In the latter case, by elevating the motor voltage, the current required by the motor to develop a given torque is proportionately reduced and similarly reducing the size of the inverter.

Nominally, a typical inverter will have a maximum-to-minimum DC voltage rating ratio of roughly 0.5, e.g. 640 to 1250 VDC for a current commonly available 690V class industrial inverter. To fully utilize the storage capacity of the capacitor, the capacitor should be fully discharged. This is not practicable for a typical inverter due to the minimum operating voltage requirements. As such, a means to more fully utilize the storage capability of the capacitor bank is desirable. This can take the form of a DC-DC converter to boost the voltage (such as shown in FIG. 4) or the switching of the storage capacitors from parallel (i.e. low-voltage) to series-connected (i.e. high-voltage) (such as shown in FIG. 3).

FIG. 3 shows a novel approach that uses adaptive switching to change the circuit ordering of the capacitors. The capacitors are divided into banks 84, 86, 88 and 90. These banks 84, 86, 88 and 94 are of a convenient size. At high states of charge, the capacitor banks 84, 86, 88 and 90 are connected in parallel. As the charge depletes and the voltage falls, the banks 84, 86, 88 and 90 are switched into series combination so as to raise the voltage to a useful range once again. The reverse is also true. As charge builds and voltage rises, the capacitor banks 84, 86, 88 and 90 are then switched into a parallel arrangement.

Specifically, when all capacitor banks 84, 86, 88 and 90 are in parallel, switches 92, 94, 96, 98, 100 and 102 are closed and switches 104, 106 and 108 are open. This configuration gives the lowest voltage for a given charge level. As the charge depletes and voltage falls, the capacitor banks 84, 86, 88 and 90 can be switched into a series-parallel configuration by opening switches 100 and 102 and closing switch 106. This places half of the capacitor banks in series and half in parallel so as to double the voltage and allowing the inverter to continue to discharge the capacitor banks. Again, as voltage falls, switches 92, 94, 96 and 98 are now open and switches 104, 106 and 108 are closed. This puts all the capacitor banks 84, 86, 88 and 90 in series so as to double the voltage and allowing the inverter to continue to charge the capacitor banks until 98% of the capacitor energy is recovered.

Multiple switch combinations and topologies are possible. This is the principal can be reduced to a single series-parallel switching arrangement or extended to more banks for finer voltage control. The method illustrated in FIG. 3 improves the effective storage utilization of the capacitor banks 84, 86, 88 and 90 from 75% to over 98%. Importantly, this allows the package that contains the capacitor banks 84, 86, 88 and 90 to be relatively small and included within the design of the wheel.

FIG. 4 shows an alternative embodiment to that of FIG. 3 by showing a bidirectional DC-DC converter 110 used for the purposes of boosting the voltage to the DC power bus 112 and to reducing the voltage to the capacitor bank 114 that is generated by the motor/inverter during deceleration. The DC-DC converter 110 is able to move power in either direction.

FIG. 4 shows a generic example of the DC-DC converter 110. Multiple topologies can be used to achieve the management of voltage and power. The percent utilization of the capacitor banks storage capability can depend upon the details of the DC-DC converter topology choice and its minimum voltage requirements. This technique can also be combined with the previous capacitor switching technique (as shown in FIG. 3).

It should be noted that the high efficiency of the wheel motor design of the present invention and the part-time duty cycle associated with stop-and-go traffic patterns, heat build-up can be controlled by either passive or active thermal management. For passive control, heat can be dissipated through both conductive paths and convective thermal paths facilitated as a result of the rotation of the wheel. Air coolant passages and large area fins can be integrated so as to assist with heat extraction. Active thermal control can also use sealed heat pipes with a two-phase cooling system optimized for the maximum and minimum temperatures expected to be encountered by the system of the present invention.

A significant amount of analysis has been carried out with respect to the wheel motor of the present invention. It is important that the motor torque be sized to achieve acceleration commensurate with engine-driven performance of conventional combustion engine drives. For sizing the motor torque from the wheel motor of the present invention, a typical SUV passenger vehicle is considered. In particular, this is a four-door, 2019 Ford Edge. There is no grade, no headwind or tailwind involved. The rolling resistance is a maximum of 0.015 over the 0 to 30 mph speeds and commensurate for an ordinary passenger car on concrete and new asphalt. The aerodynamic drag coefficient for the vehicle is 0.36. In this configuration, each wheel station of the vehicle is fitted with the wheel motor assembly.

Based upon current information, under full acceleration, the Ford Edge achieved 60 miles an hour at 6.8 seconds and ultimately can reach 100 mph at 20.0 seconds. Using a second order polynomial fit, a velocity versus time curve is produced in FIG. 5. For a more realistic driving pattern, the time-to-speed curve of FIG. 5 was reduced by 25%. The vehicle simulation model was then exercised. As shown in FIG. 6, and at 70% of full throttle a constant torque rating of 435 ft-lb (59N-M) was needed to achieve a vehicle speed of 30 mph in 4.4 seconds. A velocity of 40 miles an hour is reached at 5.8 seconds.

Figure 7:
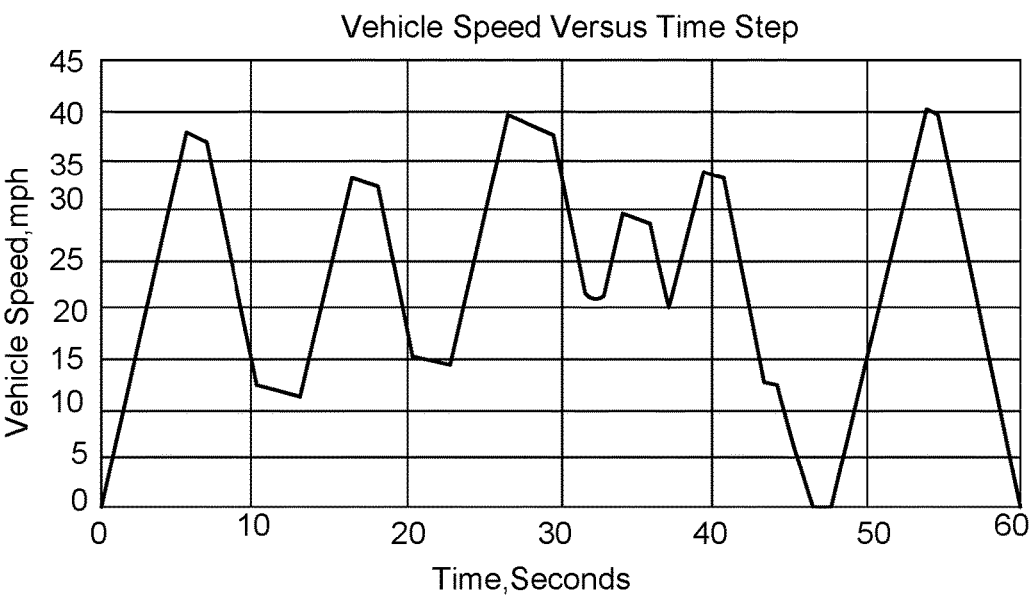
FIG. 7 is a graph showing vehicle speed versus time during arterial and local traffic congestion.

Based upon typical traffic patterns in arterial and local congested traffic patterns, a 60 second representation of vehicle speed versus time is illustrated in FIG. 7. This shows vehicle speed over a 60 second representative segment. The segment numerically replicates stop-and-go traffic with intermittent speeds ranging from 40 miles an hour to 0 mph.

The vehicle simulation model was exercised over this traffic segment to determine the amount of stored energy needed for the wheel motor operation of the present invention. The amount of energy storage capacity (Wh) needed was determined by varying the capacity until the state of charge (SOC) range was maintained between the setpoints of 90% and 10%. This analysis determined that 120 Wh of stored energy capacity was required.

The following is a simulation showing the benefits of reduced fuel use and emissions with the wheel motor technology of the present invention is applied in congestive traffic. Specifically, the following TABLE 1 lists some of the key modeling parameters as follows:

TABLE 1

| Parameter Description | Value |
|---|---|
| Modeling Time Step | 100 ms |
| KRW's Torque Rating | 435 ft-lbf (590 nm) |
| Number of KRWs | All four wheel stations |
| Capacity of Capacitor ESS | 120 Wh, 30 Wh each |
| % Depth of Discharge for ESS | 80% |
| Maximum State of Charge | 90% |
| Minimum State of Charge | 10% |
| Added Vehicle Energy for Losses per Time Step, Initiated at Low SOC | 1.00 Wh at 40 mph and Linear with Speed Initiated at 50% SOC |
| Added Vehicle Energy for Losses per Time Step, Initiated at High SOC | 0.24 Wh at 40 mph and Linear with Speed Initiated at 70% |
| KRW One Way Efficiency | 90% |
| Vehicle Engine Efficiency | 30% |
| Vehicle Transmission/Drivetrain Efficiency | 70% |

As mentioned earlier, this analysis is a linear solution with a time step of 100 ms. For the selected vehicle (i.e. the 2019 Ford Edge), the wheel motor the present invention is torque-rated at 435 ft-lb (590 Mm) at all four wheels. Total capacity for the ESS is 120 Wh. Discharge is regulated between a SOC of 90% and 10%. The one-way efficiency of the wheel motor of the present invention is 90%. Vehicle engine and transmission efficiencies are 30% and 70%, respectively. The energy storage system of the present invention is charged by extracting vehicle kinetic energy through regenerative braking. Therefore, incremental inputs of vehicle energy are required to overcome parasitic losses and electrical losses. Vehicle energy input is commanded based on a two-step approach to maintain proper SOC control in the energy storage system.

Figure 8:
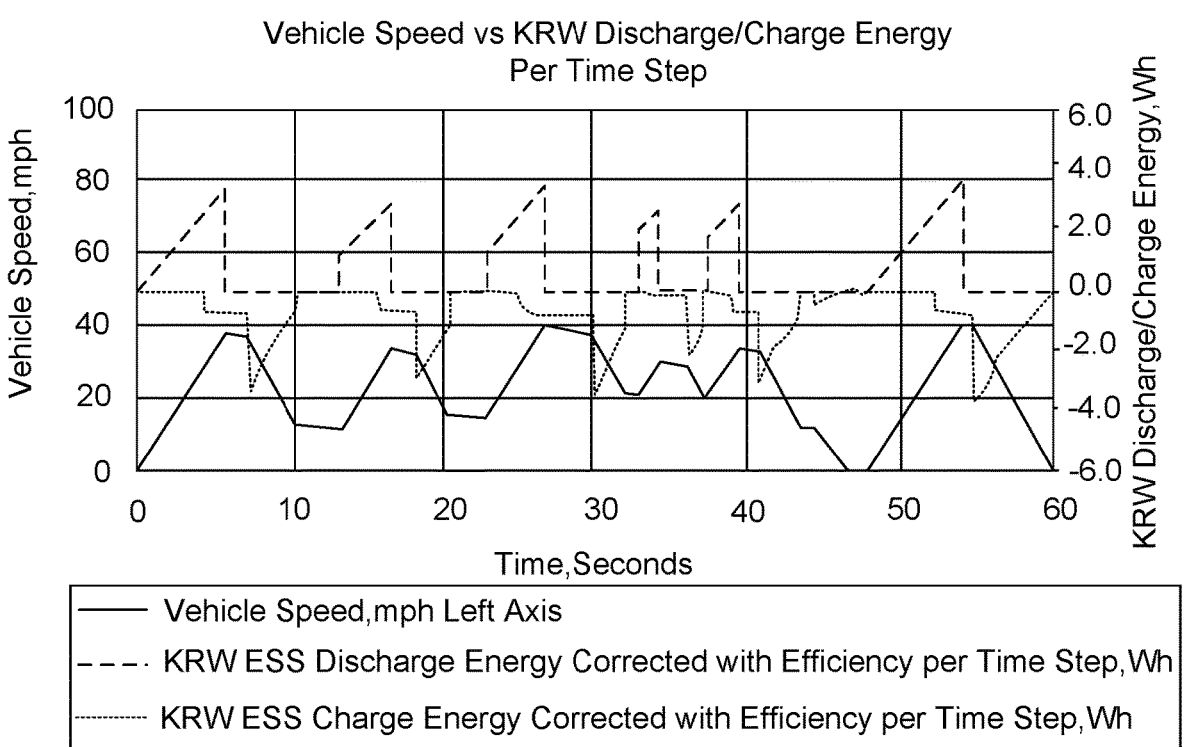
FIG. 8 is a graph of vehicles speed versus discharge/charge energy for losses.

The vehicle model was exercised over the 60 second, stop-and-go traffic segment discussed in association with FIG. 7 hereinabove. FIG. 8 shows the load-leveling action of the wheel motor of the present invention. For example, the wheel motor of the present invention applies positive wheel torque. This added energy is shown in FIG. 8. For decreased speed the wheel motor of the present invention applies negative torque. This negative or braking energy is shown as the dashed line in FIG. 8. During regenerative braking, the energy storage system is recharged.

FIG. 9 shows the changing SOC of the energy storage system as a result of vehicle acceleration and deceleration. The energy storage system is controlled between the SOC setpoints of 90% and 10%. The energy supplied by the engine to negate all losses per time step is also shown. Losses include electrical losses for the wheel motor, aerodynamic losses, and tire rolling resistance losses.

FIG. 10 graphically shows the present individual parasitic losses per time step. The wheel motor of the present invention is a constant torque rating of 435 ft-lb. However, torque is varied to achieve the needed acceleration to match target velocities. As torque increases, its electrical losses also increase. Also, increased velocity results in increased aerodynamic and rolling resistance losses. Total energy losses over 60 seconds are in the order of approximately 170 Wh.

Using the parameters shown in TABLE 1, the model was exercised over a 30-minute segment of congested traffic replicated from the 60 second traffic data found in FIG. 7. By comparing values with and without the wheel motor of the present invention, fuel savings was determined. Total energy for vehicle propulsion without the wheel motors is 395 Wh. During regenerative braking, the wheel motor of the present invention recovers 314 Wh of energy. This value is not equal to the acceleration energy of 395 Wh since aerodynamic and tire rolling resistance losses are parasitic and not recoverable. Therefore, the energy required by the wheel motor of the present invention for vehicle propulsion is 170 Wh.

The stored energy of the wheel motor of the present invention is derived from recovery of the vehicle's kinetic energy. All calculations to convert energies is shown in the following TABLE 2 into gallons are subject to engine and driveline inefficiencies. Assuming efficiencies for the gasoline engine and transmission and driveline of 30% at 70%, respectively, operation with the wheel motors of the present invention reduces fuel use by 57%. Fuel reduction directly scales with emissions. Therefore, emissions are also reduced by 57%. This is shown below:

TABLE 2

| Vehicle Propulsion Energy with and without KRW | | |
|---|---|---|
| Vehicle propulsion energy needed without KRW | 395.3 Wh | 1.41 gallons |
| Vehicle propulsion energy supplied by KRW | 395.3 Wh | 1.41 gallons |
| Vehicle propulsion energy recovered by KRW | −313.7 Wh | −1.12 gallons |
| Net vehicle propulsion energy supplied by KRW | 81.6 Wh | 0.29 gallons |
| Total KRW electrical losses | 88.3 Wh | 0.31 gallons |
| Total KRW energy | 169.9 Wh | 0.61 gallons |
| Fuel and Emission Savings with KRW | | 57.0% |

The wheel motor operates without any control commands to or from the vehicle. The operator accelerates and decelerates (i.e. brakes) in a normal fashion during stop-and-go traffic conditions. Based on the multi-axis acceleration measurements conducted on the wheel motor the present invention, the wheel motor senses when the vehicle is accelerating or braking. Errors induced by hilly or uneven terrain are avoided using this multi-axis approach. Accelerometers integrated into the control system or into the energy storage system can be applied in order to determine whether the vehicle is accelerating, decelerating and/or braking. When the accelerometer of the vehicle detects vehicle acceleration, positive torque is delivered by the wheel motor. The torque level is determined by acceleration level and the SOC of the wheel motor. The operator can cancel acceleration by tapping the brake pedal with enough force to cause slight vehicle deceleration. The accelerometer will sense such acceleration/deceleration and then reset the wheel motor to either deliver propulsion or braking actions. When the accelerometer of the wheel motor detects deceleration caused by an operator applying the conventional brakes, negative torque is applied to the vehicle. The torque level is determined by deceleration level and the SOC of the wheel motor. Slight engine throttle applied by the operator resulting in acceleration will cancel the braking action of the wheel motor. The wheel motor can be reset to deliver propulsion or braking actions. During deceleration, the energy storage system is recharged to the extent possible permitted by the available vehicle kinetic energy. Efficiency losses slowly consume the stored energy in the energy storage system. When the energy storage system is at a low SOC, the wheel motor gradually decreases its share of accelerating torque until it is recharged. The next time the operator has increased vehicle speed with the gas pedal and begins to slow the vehicle by braking, the wheel motor recovers its SOC by capturing the vehicle's kinetic energy. Likewise, if the energy storage is at high SOC, the wheel motor gradually decreases its share of braking torque. In all circumstances the operator is able to control vehicle speed with the brake pedal.

Vehicle parasitic and electrical efficiency losses also slowly consume the stored energy in the wheel motor. When the energy storage system is at a low SOC, the wheel motor gradually decreases its share of accelerating torque. The operator always can smoothly vary acceleration with the gas pedal. The wheel motor then uses the next braking action to recharge the energy storage system. Likewise, if the energy storage system is at a high SOC during braking, the wheel motor gradually decreases its share of braking torque until the actions of the wheel motor lower the SOC.

The wheel motor the present invention permits fuel savings and emissions reduction similar to that of electrical vehicles in which the wheel motor is retrofitable to fossil-fueled vehicles. Unlike the wheel motors available commercially today, the present invention integrates an energy storage system directly into the assembly. This offers the benefit of regenerative energy braking without the added cost of larger, more expensive batteries typically found on electrical vehicles.

Computer simulations were completed to determine fuel savings and emissions reductions for typical stop-and-go congested traffic. The retrofitting of a fossil-fueled vehicles with the wheel motors of the present invention can result in the 57% reduction in fuel use and emissions output for stop-and-go traffic up to 40 miles per hour. The technology can also provide acceleration boosts and energy recovery during deceleration at higher velocity driving cycles, such at 50 miles per hour to 65 mph or 60 miles an hour to 70 miles an hour. The retrofit with the technology of the present invention results in significant fuel savings and emissions reductions in typical stop—and having go traffic congestion.

The controls schemes in the present invention can either be independent or integrated. The present invention utilizes a novel approach of adaptive switching between parallel and series circuit ordering of the capacitors and the DC-DC converted-based adaptive voltage control to optimize the wheel motor operation.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A wheel assembly for a vehicle comprising:
a rotor housing adapted to be supported on wheel bearings of the vehicle, said rotor housing having a support structure connected to a rotor, the support structure having a wheel rim, the rotor having permanent mag-nets therein, wherein the support structure of said rotor housing is affixed to a wheel hub;
a stator support structure adapted to be affixed to a non-rotatable portion of the vehicle, said stator support structure having windings therein, the windings being spaced from the permanent magnets of the rotor housing by an air gap, wherein the rotor is positioned radially inwardly of the windings, said stator support adapted to be affixed to a steering knuckle of the vehicle; and
an energy storage module affixed to or positioned within said stator support structure and entirely within the wheel assembly, said energy storage module cooperative with the windings of said stator support structure so as to receive energy from the windings and transmit energy to the windings relative to a motion of the vehicle.

2. The wheel assembly of claim 1, further comprising:
a tire affixed to the wheel rim of said rotor housing.

3. The wheel assembly of claim 1, said energy storage module having a housing affixed only to said stator support structure.

4. The wheel assembly of claim 1, said energy storage module having a energy storage element selected from the group consisting of capacitors, ultra-capacitors, chemical batteries, solid-state batteries and combinations thereof.

5. The wheel assembly of claim 1, wherein the air gap is concentric to an axis of rotation of said rotor housing.

6. An assembly comprising:
a vehicle having a plurality of wheel stations, each wheel station of the plurality of wheel stations having a wheel hub and wheel bearings and wheel bolts, the wheel hub being connected to a hub shaft, the plurality of wheel stations having at least one steering wheel station, the at least one steering wheel station having a steering knuckle; and
a wheel assembly affixed to at least one of the plurality of wheel stations, said wheel assembly being affixed to the wheel hub and bolted to the wheel bolts, said wheel assembly comprising:
a rotor housing supported on the wheel bearings of said vehicle, said rotor housing having a support structure connected to a rotor, the support structure defining a wheel rim, wherein the rotor has permanent magnets therein, wherein the support structure of said rotor housing is affixed to the wheel hub;
a stator support structure affixed to a non-rotatable portion of said vehicle, said stator support structure having windings therein, the windings being spaced from the permanent magnets of the rotor by an air gap, wherein the rotor is positioned radially inward of the windings, said stator support structure being affixed to the steering knuckle; and
an energy storage module affixed within said stator support structure and entirely with said wheel assembly, said energy storage module cooperative with permanent magnets and the winding so as to receive and transmit energy from and to the permanent magnets and the windings.

7. The assembly of claim 6, further comprising:
a tire affixed to the wheel rim of said rotor housing.

8. The assembly of claim 6, said energy storage module having a housing affixed to said stator support housing.

9. The assembly of claim 8, said energy storage module having an energy storage element selected from the group consisting of capacitors, ultra-capacitors, chemical batteries, solid-state batteries and combinations thereof.

10. The assembly of claim 6, wherein the air gap is concentric to the axis of rotation of the wheel hub.

\* \* \* \* \*